T. ELLIOTT.
CAR TRUCK.
APPLICATION FILED OCT. 8, 1919.

1,365,900.

Patented Jan. 18, 1921.
2 SHEETS—SHEET 1.

Inventor
Thomas Elliott,
Toulmin & Toulmin,
Attorneys

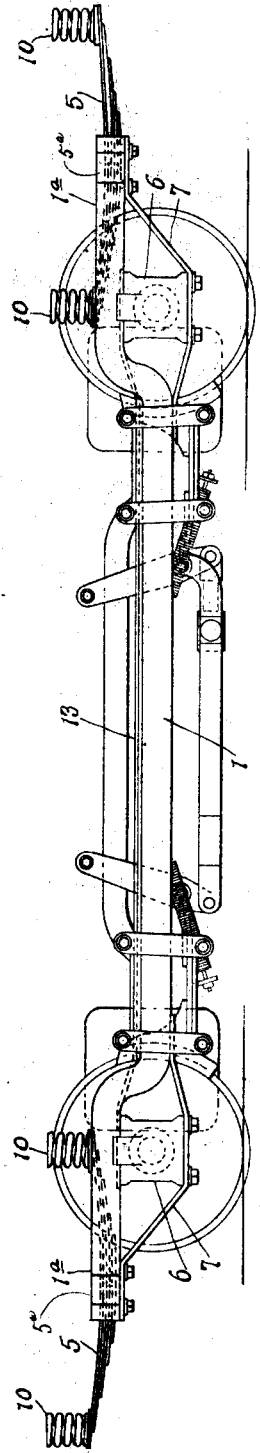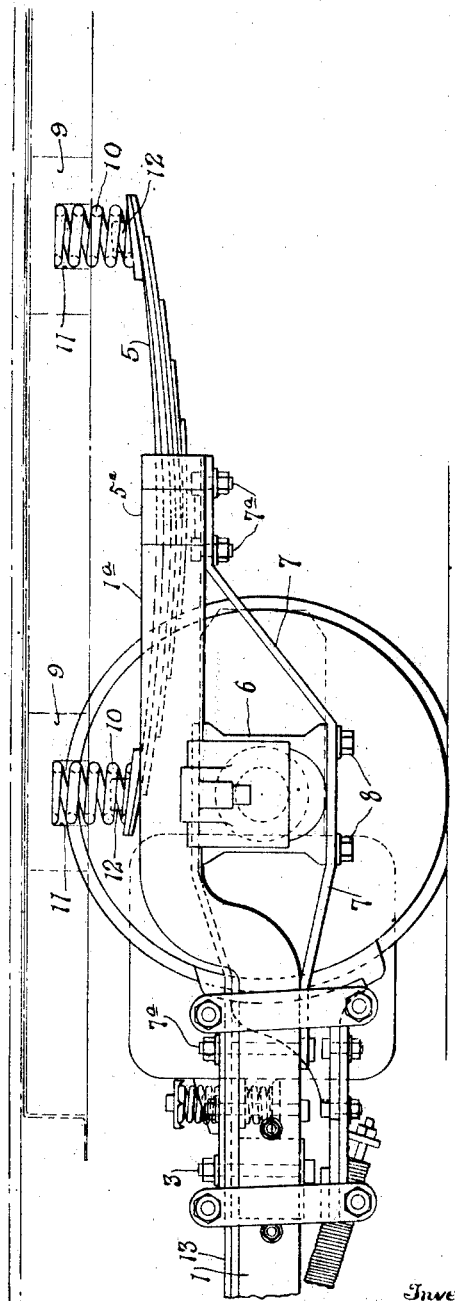

UNITED STATES PATENT OFFICE.

THOMAS ELLIOTT, OF CINCINNATI, OHIO, ASSIGNOR TO THE CINCINNATI CAR COMPANY, OF CINCINNATI, OHIO, A CORPORATION OF OHIO.

CAR-TRUCK.

1,365,900. Specification of Letters Patent. Patented Jan. 18, 1921.

Application filed October 8, 1919. Serial No. 329,328.

*To all whom it may concern:*

Be it known that I, THOMAS ELLIOTT, a citizen of the United States, residing at Cincinnati, in the county of Hamilton and State of Ohio, have invented certain new and useful Improvements in Car-Trucks, of which the following is a specification, reference being had therein to the accompanying drawing.

This invention relates to car trucks and has for its particular object to provide an improved truck especially adaptable for single-truck street cars.

An object of the invention is to provide a truck substantially of the improved design and construction shown in my copending application for Letters Patent, filed June 9th, 1919, Ser. No. 302,718.

The improvements of the present invention consist in a novel arrangement of the springs relative to the axles, and truck and car frames, the arrangement, as here shown, consisting in making the spring base substantially longer than the wheel base, the object being to stabilize the movement of the car body relative to the trucks.

A common difficulty experienced in the operation of single-truck street cars consists in a longitudinal teetering movement of the body of the car when the car is operated at high speed or over uneven tracks which is caused by a relatively short wheel base. The elongation of the spring base substantially beyond the wheel base, as in the present invention, tends to minimize such movement of the car body. The improved arrangement of the springs also permits the use of lighter and therefore more resilient springs with the result that easier riding qualities of the car are effected.

The preferred arrangement of the springs, as here shown, consists in securing at the opposite ends and sides of the truck frame semi-elliptical springs and helical springs interposed between the opposite ends of each semi-elliptical spring and the car frame, the arrangement being substantially the same as in the construction shown in my earlier application referred to, except the important difference in the length of the spring base relative to the wheel base and certain details of construction which are features of the new arrangement.

In the present arrangement of the springs all the advantages gained in my earlier invention relative to proportionate lightness and strength, and the flexibility and resiliency of the truck frame are preserved, and further improvement is realized both with respect to end and side sway of the car body, as with the extension of the spring base a marked improvement in the stabilizing and riding qualities of the car is effected.

In the accompanying drawings:

Fig. 2 is a side elevation of the truck shown in Fig. 1;

Fig. 3 is an enlarged detail view of one set of springs showing its relation to the wheel base and the car frame.

Figure 1:
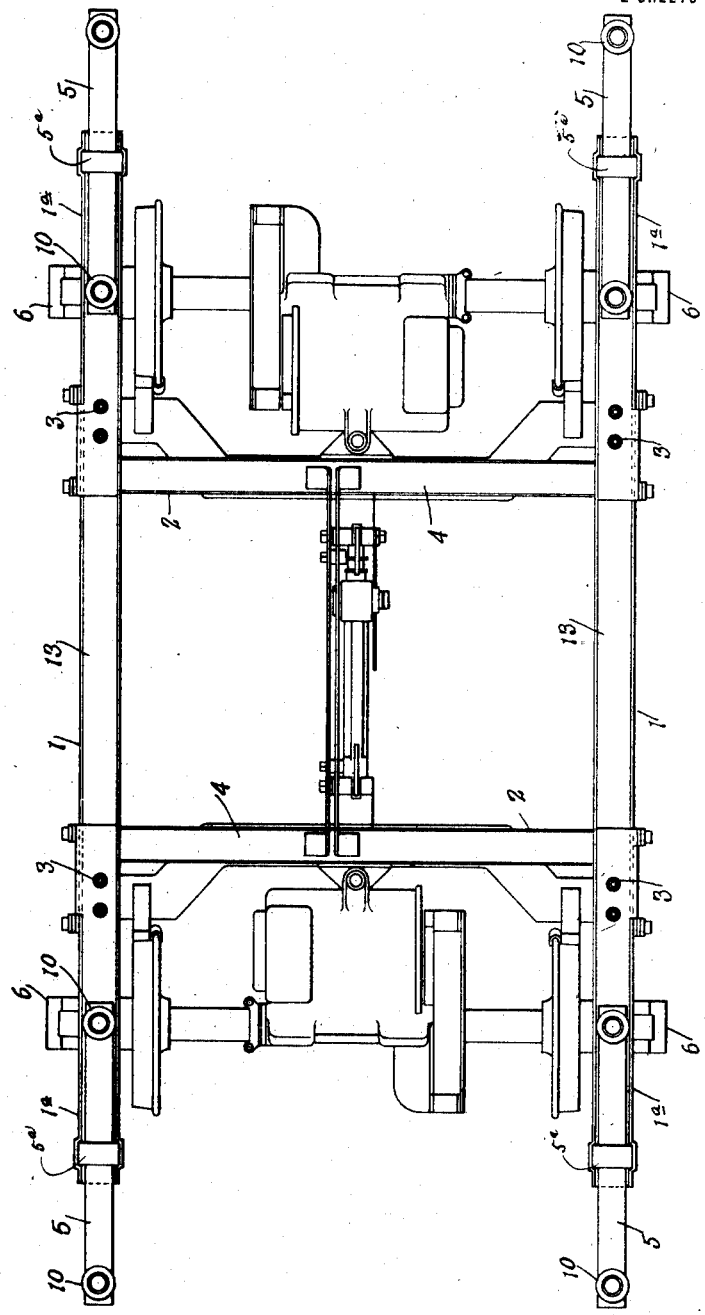
Figure 1 is a plan view of my improved truck showing the relative arrangement of the wheel and spring base relative to the car body.

As here shown the truck frame is substantially rectangular shaped and consists of two longitudinal side frame members 1 and the transverse or cross members 2 which may be secured to the side members in any suitable manner, as by bolts 3, thus making in effect an integral frame.

The frame is preferably constructed of channel steel, U-shaped in cross section, the channels being filled with any suitable material, such as wood sills 4 which are fitted into the channels and serve to reinforce the frame and act to deaden the noise of the truck transmitted through the frame, also to make the frame more or less resilient, aiding materially in combination with the truck springs to absorb the vibrations and shocks transmitted therethrough to the body of the car.

The side frame pieces 1 at their opposite ends have an upwardly and forwardly extending off-set portion 1ª which serves as a seat for the semi-elliptical spring 5 and provides clearance space for the axle journal box 6, an arm or bracket member 7 being secured to the under side of the U-channel by bolts 7ª opposite the off-set portion thereof and extending forward and upward beyond the journal box to support the extended end of the truck frame. Bolts 8 are employed to hold the journal box in place between the projecting end of the frame 1 and the bracket 7 and a strap 5ª is interposed between the opposite edges of the semi-elliptical springs and the sides of the channel, the sides of the strap acting as cheek-plates to prevent lateral displacement of the springs when the same are compressed. To reinforce the frame between the wheels steel plates 13 are used which extend longitudinally of the frame on opposite sides thereof and at their opposite ends over the top of the journal boxes, being secured to the channeled ends of the frame by journal box bolts 8 and between the ends to the wood filler of the channels by suitable bolts extending through the frames.

It will be observed that the journal boxes here shown are of standard Master Car Builders' construction and that no special arrangement, other than off-setting the side frame members is required to assemble the journal boxes to the frame. This feature of the improved truck is important as it enables usage of standard truck equipment where heretofore on single trucks of this character it has been necessary to use journal boxes especially designed for the particular type of frame used which did not meet with favor by the operators.

Interposed between the ends of the leaf springs and the cross sills 9 of the car body are helical or coiled springs 10, the springs being seated in the sills in sockets 11 and on the leaf springs, over retaining plates 12.

It will be observed that the truck frame extends substantially beyond the wheel base at both ends thereof, that the semi-elliptical springs are located on these extensions of the frame and therefore that the spring base does not coincide with the wheel base, as in my earlier improved truck herein referred to.

In view of the heaver strains sustained by the truck frame with the extended spring base, the frame is made accordingly heavier, and is reinforced by the end frame braces 7 and the longitudinal frame plates 13, which serve respectively to reinforce the frame at its projecting ends upon which the springs rest, and between the wheels where additional strain is caused by the elongation of the spring base.

The brake mechanism of my improved truck is in all respects substantially like the brake mechanism of the truck which forms the subject matter of my earlier application referred to. It is not necessary, therefore, to herein describe the brake mechanism in detail. As shown, the mechanism consists of parallel hanger supports secured to the four corners of the frame and connected to the brake beams, as described in detail in the copending case.

From the foregoing detailed description it will be apparent that my improved truck consists of a rectangular shaped frame which is in effect an integral structure, having its side and cross members formed, preferably of U-shaped channeled steel, and the channels filled with wood to reinforce the same and to act to deaden the noise of the truck; of an off-set portion at the ends of the side frame members to provide suitable space for journal boxes of standard construction; of semi-elliptical springs mounted upon the off-set portions of the side frame substantially beyond the vertical center of the wheel axles, and helical springs interposed between the free ends of the elliptical springs and the cross sills of the car body; and brake hangers arranged in pairs parallel to each other and acting to suspend the brake beams and shoes in a manner to cause the same to move substantially in a horizontal plane.

The use of the open top channel frame construction of sufficient width to receive the elliptical springs enables lowering of the car body to the extent of the depth of the channels which is a material advantage in the operation of cars equipped with the improved trucks. The main advantage in the present construction, however, consists in supporting the weight of the car body upon semi-elliptical springs co-acting with helical springs interposed between the ends of the springs and the car frame and having their base extending substantially beyond the wheel base, thus lending the greater stabilization of the car and improvement of its riding qualities. In the preferred construction there are no vertical guides or radius rods between the car body and truck, all driving strains and stresses being thus transmitted through the semi-elliptical and helical springs and absorbed or modified thereby before reaching the car body. In this respect the improved truck follows the most approved practice in automobile spring construction wherein a similar arrangement of semi-elliptical springs, known as the Hotchkiss drive, is employed.

While as here shown I employ essentially the preferred construction and arrangement of my invention, I do not wish to be limited to the exact details shown as wide variations with respect to the detail features can readily be made by those skilled in the art without departing from the purpose and spirit of the invention.

Having thus fully described my invention, what I claim as new and desire to secure by Letters Patent, is:—

1. In a car truck, the combination, with wheels, axles and journal boxes of standard construction, a rectangular shaped frame suspended from said journal boxes substantially in the horizontal plane of said axles and having its side members off-set to extend over the journal boxes substantially beyond the wheel base, semi-elliptical springs supported on the off-set portions of said frame outwardly in advance of the vertical center of said axles, and helical springs interposed between the opposite free ends of said springs and the cross sills of the car.

2. In a car truck, the combination, with wheels, axles and journal boxes of standard construction, a truck frame suspended from said journal boxes substantially in the horizontal plane of said axles and having its side members off-set to extend over the journal boxes substantially beyond the wheel base, semi-elliptical springs mounted on the off-set portions of said frame outwardly in advance of the vertical center of said axles, and helical springs interposed between the opposite free ends of said springs and the cross sills of the car.

3. In a car truck, the combination, with wheels, axles and journal boxes, a truck frame suspended from said journal boxes and having its side members off-set to extend over the journal boxes substantially beyond the wheel base, semi-elliptical springs mounted on the off-set portions of said frame outwardly in advance of the vertical center of said axles, and helical springs interposed between the opposite free ends of said springs and the cross sills of the car.

4. In a car truck, the combination, with wheels, axles and journal boxes, a truck frame suspended from said journal boxes and extending over the journal boxes substantially beyond the wheel base, semi-elliptical springs mounted on said frame outwardly in advance of the vertical center of said axles, and helical springs interposed between the opposite free ends of said springs and the cross sills of the car.

5. In a car truck, the combination, with wheels, axles and journal boxes, a truck frame consisting of side and cross members substantially U-shaped in cross section and suspended from said journal boxes substantially in the horizontal plane of said axles and having its side members off-set to extend over the journal boxes substantially beyond the wheel base, semi-elliptical springs supported on the off-set portions of said frame outwardly in advance of the vertical center of said axles, and helical springs interposed between the free ends of said springs and the cross sills of the car.

6. In a car truck, the combination, with wheels, axles and journal boxes, a truck frame constructed of upwardly turned U-channels filled with wood, suspended from said journal boxes substantially in the horizontal plane of said axles and having its side members off-set to extend over the journal boxes substantially beyond the wheel base, semi-elliptical springs mounted on the off-set portions of said frame outwardly in advance of the vertical center of said axles, and helical springs interposed between the free ends of said springs and the cross sills of the car.

7. In a car truck, the combination, with wheels, axles and journal boxes, a truck frame constructed of U-channels filled with wood, suspended from the journal boxes and having the ends of its side members extending thereover substantially beyond the wheel base, semi-elliptical springs mounted on said frame outwardly in advance of said axles, and helical springs interposed between the free ends of said springs and the cross sills of the car.

8. In a car truck, the combination, with wheels, axles and journal boxes, a rectangular-shaped truck frame constructed of U-shaped channels filled with wood, suspended from the journal boxes and having the projecting ends of its side members off-set and extending over the journal boxes substantially beyond the wheel base, semi-elliptical springs mounted on the off-set portions of said frame outwardly in advance of the vertical center of said axles, and helical springs interposed between the free ends of said springs and the cross sills of the car.

9. In a car truck, the combination, with wheels, axles and journal boxes, a truck frame suspended from said journal boxes and having its side members channeled and off-set to extend over the journal boxes substantially beyond the wheel base, semi-elliptical springs mounted in the channels of the off-set portions of said frame outwardly in advance of the vertical center of said axles, helical springs interposed between the free ends of said springs and the cross sills of the car, and bolts securing the frame to the journal boxes.

10. In a car truck, the combination, with wheels, axles and journal boxes, a truck frame suspended from said journal boxes and having its side members channeled and off-set to extend over the journal boxes substantially beyond the wheel base, semi-elliptical springs mounted in the channels of the off-set portions of said frame outwardly in advance of the vertical center of said axles, helical springs interposed between the free ends of said springs and the cross sills of the car, bolts disposed on opposite sides of the journal boxes, securing the frames thereto, and cheek plates extending over the edges of the semi-elliptical springs to serve as guides for the springs in the flexing movements thereof.

11. In a car truck, the combination, with wheels, axles and journal boxes, a truck frame suspended from said journal boxes and having its side members off-set to extend over the journal boxes substantially beyond the wheel base, semi-elliptical springs mounted on the off-set portion of said frame outwardly in advance of the vertical center of said axles, helical springs interposed between the free ends of said springs and the cross sills of the car, bolts disposed on opposite sides of the journal boxes securing the frames thereto, and cheek plates in the channels of said frame to prevent lateral displacement of the semi-elliptical springs.

12. In a car truck, the combination, with wheels, axles and journal boxes, a truck frame constructed of upwardly turned U-channels filled with wood, suspended from said journal boxes substantially in the horizontal plane of said axles and having its side members off-set to extend over the journal boxes, semi-elliptical springs mounted in the channels of the off-set portions of said frame substantially outwardly in advance of the vertical center of said axles, and helical springs interposed between the free ends of said springs and the cross sills of the car.

In testimony whereof I affix my signature.

THOMAS ELLIOTT.